United States Patent
Cichy et al.

(10) Patent No.: US 12,373,265 B1
(45) Date of Patent: Jul. 29, 2025

(54) TECHNOLOGIES FOR RULES ENGINES ENABLING HANDOFF CONTINUITY BETWEEN COMPUTING TERMINALS

(71) Applicant: Monarch Specialty Group, Inc., Chicago, IL (US)

(72) Inventors: Stephen Barrett Cichy, Chicago, IL (US); Markus Daniel Bockle, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

(21) Appl. No.: 18/910,336

(22) Filed: Oct. 9, 2024

(51) Int. Cl.
*G06F 9/54* (2006.01)
*G06F 21/32* (2013.01)

(52) U.S. Cl.
CPC .............. *G06F 9/541* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 7,111,780 B2 | 9/2006 | Broussard |
| 7,840,424 B2 | 11/2010 | Wiley, II |
| 7,856,364 B1 | 12/2010 | Wiley, II |
| 7,979,285 B2 | 7/2011 | Wiley |
| 8,032,397 B2 | 10/2011 | Lawless |
| 8,036,913 B1 | 10/2011 | Pinsonneault |
| 8,036,914 B1 | 10/2011 | Pinsonneault |
| 8,036,918 B1 | 10/2011 | Pinsonneault |
| 8,050,943 B1 | 11/2011 | Wiley |
| 8,060,379 B1 | 11/2011 | Pinsonneault |
| 8,190,453 B2 | 5/2012 | Rowe, III |
| 8,392,214 B1 | 3/2013 | Pinsonneault |
| 8,392,219 B1 | 3/2013 | Pinsonneault |
| 8,589,181 B2 | 11/2013 | Berzansky |
| 8,670,999 B2 | 3/2014 | Berzansky |
| 8,781,854 B1 | 7/2014 | Harris, Sr. |
| 8,924,231 B2 | 12/2014 | Hoffman |
| 9,076,186 B2 | 7/2015 | Burkett |
| 9,231,935 B1 | 1/2016 | Bridge |
| 9,760,871 B1 | 9/2017 | Pourfallah |
| 9,904,965 B2 | 2/2018 | White |

(Continued)

*Primary Examiner* — Kevin L Young
*Assistant Examiner* — Phuong N Hoang
(74) *Attorney, Agent, or Firm* — Dentons US LLP

(57) ABSTRACT

A rules engine to originate a first content in context of a transaction for display in a first application program operated by a user and a second content in context of the transaction for display in a second application program operated by the user, where the first content is a notice to access the second content. As such, if the first application program is secured to avoid displaying, selecting, or clicking the second content in context of the transaction, then the first content can notify the user to access the second application program for display, selection, or clicking of the second content in context of the transaction. Such configuration improves computer functionality and is technologically beneficial, because of its enablement of the transaction to be started in the first application program by the user, but continuing in the second application program operated by the user when the first application program is secured to avoid displaying, selecting, or clicking the second content.

20 Claims, 4 Drawing Sheets

(56) References Cited

U.S. PATENT DOCUMENTS

| | | |
|---|---|---|
| 10,157,262 B1 | 12/2018 | Pinsonneault |
| 10,192,193 B1 | 1/2019 | Glass |
| 10,248,641 B2 | 4/2019 | Wagh |
| 10,417,380 B1 | 9/2019 | Kaye |
| 10,489,552 B2 | 11/2019 | Pinsonneault |
| 10,496,793 B1 | 12/2019 | Lawrence |
| 10,565,656 B1 | 2/2020 | Pinsonneault |
| 10,616,146 B1 | 4/2020 | Hopkins |
| 2004/0153336 A1 | 8/2004 | Virdee |
| 2007/0276697 A1 | 11/2007 | Wiley |
| 2009/0043633 A1* | 2/2009 | Nadas ............ G06Q 10/063114 705/7.29 |
| 2010/0217622 A1 | 8/2010 | Brown |
| 2011/0145011 A1 | 6/2011 | Shell |
| 2012/0150563 A1* | 6/2012 | Carroll .................. G16H 20/10 705/2 |
| 2013/0054261 A1 | 2/2013 | Dufour |
| 2013/0211856 A1 | 8/2013 | Pribyl |
| 2013/0226608 A1 | 8/2013 | Di Lascia |
| 2014/0200928 A1 | 7/2014 | Watanabe |
| 2014/0365238 A1* | 12/2014 | Kono ..................... A61B 5/742 705/2 |
| 2015/0228030 A1* | 8/2015 | Scantland ............. G06Q 10/10 705/4 |
| 2015/0234991 A1 | 8/2015 | Pinsonneault |
| 2024/0233863 A1* | 7/2024 | Li .......................... G16B 15/30 |
| 2024/0296501 A1 | 9/2024 | Cichy |

\* cited by examiner

TECHNOLOGIES FOR RULES ENGINES ENABLING HANDOFF CONTINUITY BETWEEN COMPUTING TERMINALS

TECHNICAL FIELD

This disclosure relates to rules engines that enable handoff continuity between computing terminals.

BACKGROUND

Conventionally, a rules engine may be programmed to apply a business rule to an input (e.g., a message) originated from an application program to generate an output for display in the application program. This modality of computing promotes agility and adaptability for processes driven by dynamic rules and regulations, by decoupling a business logic from an application logic, thereby allowing a business user to modify the business logic, by modifying the business rule, without changing the application logic.

Despite the rules engine having such technological benefits, the rules engine still suffers from various technical problems. For example, conventionally, the rules engine may be programmed such that the output may be displayed in the application program. However, if the application program is secured (e.g., locked, firewalled) to avoid displaying a Uniform Resource Locator (URL) or a hyperlinked content therein, or allowing the URL or the hyperlinked content to be selected or clicked within the application program, then, if the output contains the URL or the hyperlinked content, then the application program may not display the URL or the hyperlinked content therein, or allow the URL or the hyperlinked content to be selected or clicked within the application program.

SUMMARY

This disclosure solves the technical problems identified above by enabling a rules engine to originate a first content in context of a transaction for display in a first application program operated by a user and a second content in context of the transaction for display in a second application program operated by the user, where the first content is a notice (e.g., an invitation) to access the second content. As such, if the first application program is secured (e.g., locked, firewalled) to avoid displaying, selecting, or clicking the second content in context of the transaction, then the first content can notify (e.g., invite, prompt, signal) the user to access the second application program for display, selection, or clicking of the second content in context of the transaction. Such configuration improves computer functionality and is technologically beneficial, because of its enablement of the transaction to be started in the first application program by the user, but continuing in the second application program operated by the user when the first application program is secured (e.g., locked, firewalled) to avoid displaying, selecting, or clicking the second content.

DETAILED DESCRIPTION

Figure 1:
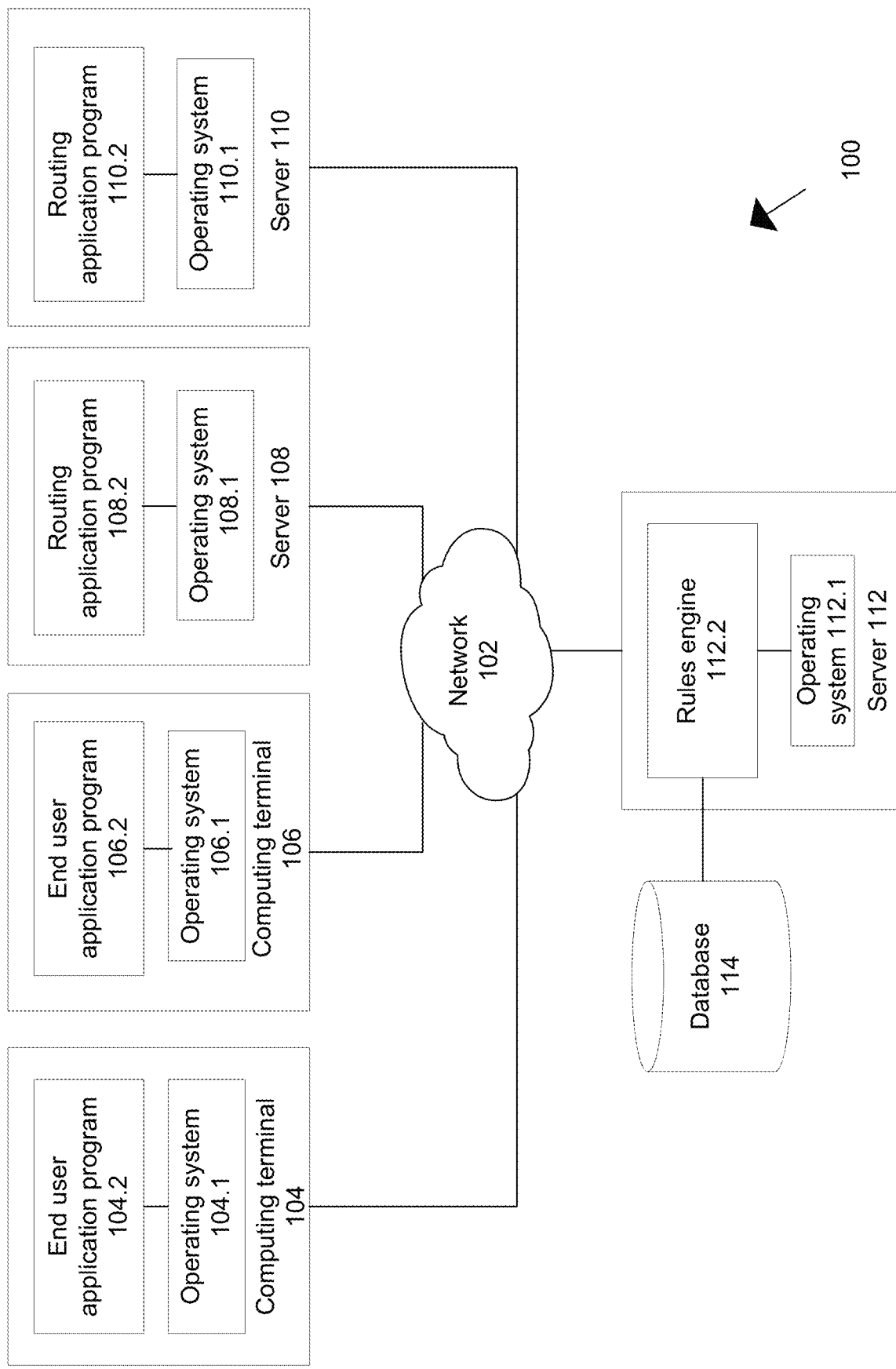
FIG. 1 shows a diagram of an embodiment of a system for enabling handoff continuity between computing terminals according to this disclosure.

As explained above, this disclosure solves the technical problems identified above by enabling a rules engine to originate a first content in context of a transaction for display in a first application program operated by a user and a second content in context of the transaction for display in a second application program operated by the user, where the first content is a notice (e.g., an invitation) to access the second content. As such, if the first application program is secured (e.g., locked, firewalled) to avoid displaying, selecting, or clicking the second content in context of the transaction, then the first content can notify (e.g., invite) the user to access the second application program for display, selection, or clicking of the second content in context of the transaction. Such configuration improves computer functionality and is technologically beneficial, because of its enablement of the transaction to be started in the first application program by the user, but continuing in the second application program operated by the user when the first application program is secured (e.g., locked, firewalled) to avoid displaying, selecting, or clicking the second content.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled persons.

Various terminology used herein can imply direct or indirect, full or partial, temporary or permanent, action or inaction, individual or collective. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes," "contains," "has," or "comprising," "including," "containing," or "having" (or any tenses thereof) when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

As used herein, a term "about" or "substantially" refers to a +/−10% variation from a nominal value/term. Such variation is always included in any given value/term provided herein, whether or not such variation is specifically referred thereto.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled persons understand that typically there is no limit on a number of items or terms in any combination, unless otherwise contextually apparent.

Features or functionality described with respect to certain embodiments may be combined or sub-combined in or with various embodiments in any permutational or combinatorial manner. Different aspects or elements of embodiments, as disclosed herein, may be combined or sub-combined in a similar manner. A skilled person will understand that typically there is no limit on a number of items or terms in any combination, unless otherwise contextually apparent Some embodiments, whether individually or collectively, can be components of a larger system, where other procedures can take precedence over or otherwise modify their application. Additionally, a number of steps can be required before, after, or concurrently with embodiments, as disclosed herein. Note that any or all methods or processes, at least as disclosed herein, can be at least partially performed via at least one entity in any manner.

Some embodiments are described herein with reference to illustrations of idealized embodiments (and intermediate structures) of this disclosure. As such, variations from various illustrated shapes as a result, for example, of manufacturing techniques or tolerances, are to be expected. Thus, various embodiments should not be construed as necessarily limited to various particular shapes of regions illustrated herein, but are to include deviations in shapes that result, for example, from manufacturing.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

United States Patent Application Publication 2022/0398667 (Ser. No. 17/399,178) is incorporated by reference herein for all purposes. Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of an embodiment of a system for enabling handoff continuity between computing terminals according to this disclosure. In particular, there is a system 100 containing a network 102, a computing terminal 104, a computing terminal 106, a server 108 (first), a server 110 (second), a server 112 (third), and a database 114. The computing terminal 104 hosts an operating system (OS) 104.1 and an end user application program 104.2 (first) such that the end user application program 104.2 runs on the OS 104.1. The computing terminal 106 hosts an OS 106.1 and an end user application program 106.2 (second) such that the end user application program 106.2 runs on the OS 106.1. The server 108 hosts an OS 108.1 and a routing application program 108.2 (first) such that the routing application program 108.2 runs on the OS 108.1. The server 110 hosts an OS 110.1 and a routing application program 110.2 (second) such that the routing application program 110.2 runs on the OS 110.1. The server 112 hosts an OS 112.1 and a rules engine 112.2 such that the rules engine 112.2 runs on the OS 112.1.

The network 102 may be a Local Area Network (LAN), a Wide Area Network (WAN), a cellular network, a satellite network, or another suitable network, whether private or public. The network may include Internet.

The computing terminal 104 may be a desktop computer, a laptop computer, a tablet computer, a mobile phone, a smartphone, a wearable computer, a vehicular computer, a Point-Of-Sale computing terminal (e.g., a cash register), or another suitable computing form factor, whether stationary or mobile. For example, the computing terminal 104 may be a positioned in a defined area (e.g., a room, a building, a store, a pharmacy, a hospital). For example, the computing terminal 104 may be a computing workstation that is freestanding, stationary, or standalone on a surface, such as a shelf, a tabletop, a floor, a carpet, a tile, or another suitable surface. For example, the computing workstation may be a desktop Personal Computer (PC) tower, a micro tower, a slim form factor, an All-In-One (AIO) desktop PC, a mini PC, a Small Form Factor (SFF), an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket.

The OS 104.1 may be Windows, Linux, MacOS, Android, iOS, or any other suitable OS.

The end user application program 104.2 runs on the OS 104.1. The end user application program 104.2 may be a browser application program, a domain specific application program, or another suitable program. For example, the domain specific application program 104.2 may be a pharmacy application program (e.g., operated by a pharmacist or a pharmacy technician in a pharmacy locale) having a software logic/UIs programmed to manage prescriptions (e.g., by identifiers), a software logic/UI programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The end user application program 104.2 may be associated with an identifier (first). For example, the end user application program 104.2 may host the identifier, which may be a user identifier, a unique identifier, a randomly generated identifier, a program identifier, or some other suitable identifier. For example, the identifier may have ten, twelve, or sixteen alphanumeric characters, although less or more is possible. For example, the identifier may be a user login (e.g., a user name and a user password, a biometric login).

The computing terminal 106 may be a desktop computer, a laptop computer, a tablet computer, a mobile phone, a smartphone, a wearable computer, a vehicular computer, a Point-Of-Sale computing terminal (e.g., a cash register), or another suitable computing form factor, whether stationary or mobile. For example, the computing terminal 106 may be a positioned in a defined area (e.g., a room, a building, a store, a pharmacy, a hospital). For example, the computing terminal 106 may be a computing workstation that is freestanding, stationary, or standalone on a surface, such as a shelf, a tabletop, a floor, a carpet, a tile, or another suitable surface. For example, the computing workstation may be a desktop PC tower, a micro tower, a slim form factor, an AIO desktop PC, a mini PC, a SFF, an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket.

The computing terminal 104 and the computing terminal 106 may be co-positioned in a defined physical area (e.g., a cubicle, a room). For example, the computing terminal 104 and the computing terminal 106 may be physically collocated within the defined physical area. For example, the computing terminal 104 and the computing terminal 106 may be spaced apart from each other at about 1 meter or less, whether on a horizontal plane, a vertical plane, or a diagonal plane, which may allow the computing terminal 104 and the computing terminal 106 to simultaneously be within a physical reach of a hand of a user operating the computing terminal 104 and the computing terminal 106 (e.g., similar to an airplane cockpit). For example, the computing terminal 104 and the computing terminal 106 may be positioned side-by-side each other to simultaneously be within the physical reach of the hand of the user operating the computing terminal 104 and the computing terminal 106 (e.g., similar to an airplane cockpit). For example, the computing terminal 106 may be attached (e.g., via an articulating arm, a stand, a bracket) to the computing terminal 104. For example, the computing terminal 104 and the computing terminal 106 may be disposed on a common surface (e.g., a shelf, a tabletop, a stand). However, note that this configuration is not required and the computing terminal 104 and the computing terminal 106 may be disposed on different surfaces (e.g., one on a shelf and one on a tabletop).

The OS 106.1 may be Windows, Linux, MacOS, Android, iOS, or any other suitable OS.

The end user application program 106.2 runs on the OS 106.1. The end user application program 106.2 may be a browser application program, a domain specific application program, or another suitable program. For example, the domain specific application program 106.2 may be a pharmacy application program (e.g., operated by a pharmacist or a pharmacy technician in a pharmacy locale) having a software logic/UIs programmed to manage prescriptions (e.g., by identifiers), a software logic/UI programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The end user application program 106.2 may be associated with an identifier (second). For example, the end user application program 106.2 may host the identifier, which may be a unique identifier, a randomly generated identifier, a program identifier, or some other suitable identifier. For example, the identifier may have ten, twelve, or sixteen alphanumeric characters, although less or more is possible. For example, the identifier may be a user login (e.g., a user name and a user password, a biometric login).

The identifier of the end user application program 104.2 may be identical in value (e.g., equal in value) to the identifier of the end user application program 106.2. For example, the identifier of the end user application 104.2 may be A$11083 and the identifier of the end user application 106.2 may be A$11083, i.e., identical in value (e.g., equal in value). The identifier of the end user application program 104.2 may be identical in format (e.g., XXX-XXX-XXX, an email address) to the identifier of the end user application program 106.2.

The end user application program 104.2 may be logically paired with the end user application program 106.2 based on the identifier of the end user application 104.2 being identical in value (e.g., equal in value) to the identifier of the end user application 106.2. For example, the identifier of the end user application 104.2 may be 123-456 and the identifier of the end user application 106.2 may be 123-456, i.e., identical in value (e.g., equal in value). The identifier of the end user application program 104.2 may be identical in format (e.g., XX-XXX-X, a biometric) to the identifier of the end user application program 106.2 to enable the end user application program 104.2 be paired with the end user application program 106.2.

This logical pairing between the end user application program 104.2 and the end user application program 106.2 may be enabled (e.g., enforced) via a pairing application program running on an OS of a server, where the server is remote from the computing terminal 104 and the computing terminal 106, and the pairing application program is in communication with the end user application program 104.2 and the end user application program 106.2, whether continuously (e.g., every second) or periodically (e.g., every few minutes, hours, days), to enforce such logical pairing. The server may be the server 112 or another server communicating with the network 102 (e.g., wired, wireless, waveguide). Alternatively, the end user application program 104.2 and the end user application program 106.2 may be paired to each other by the computing terminal 104 and the computing terminal 106 being paired to each other over a personal area network (PAN) connection (e.g., Bluetooth) based on the identifier of the end user application program 104.2 being identical in value (e.g., equal in value) to the identifier of the end user application program 106.2. As such, if the computing terminal 104 and the computing terminal 106 are not paired to each other (e.g., too far apart to enforce the identifiers being equal in value), then the end user application program 104.2 and the end user application program 106.2 may not be paired to each other, although then such logical pairing may occur over the network 102 whether indirectly (e.g., via a server) or directly (e.g., via a P2P protocol or a FTP protocol). Note that logical unpairing can involve undoing, reversing, or negating these steps.

The end user application program 104.2 and the end user application program 106.2 may have equal, same, or similar functionality or data permissioning relative to each other, whether before or after logical pairing to each other. For example, the end user application program 104.2 and the end user application program 106.2 may have equal, same, or similar user interface, data operations, and data permissions, whether before or after logical pairing to each other, which may allow one to operate as a replacement to the other (e.g., as a copilot, a wingman, an assistant).

The end user application program 104.2 and the end user application program 106.2 may have unequal, not same, or dissimilar functionality or data permissioning relative to each other, whether before or after pairing to each other. For example, the end user application program 104.2 and the end user application program 106.2 may have unequal, not same, or dissimilar user interface, data operations, and data permissions, whether before or after logical pairing to each other, where either one may have more or less functionality than the other, which may allow one to operate supplementary or complementary to the other (e.g., as a copilot, a wingman, an assistant). For example, the end user application program 104.2 may be dominant to the end user application program 106.2 (e.g., a master-slave architecture) or the end user application program 106.2 may be subservient to the end user application program 104.2 (e.g., a slave-master architecture), once the end user application program 106.2 is logically paired with the end user application program 104.2, such that the end user application program 106.2 may operate as a copilot, a wingman, or an assistant to the end user application program 104.2. For example, the end user application program 104.2 may be a main, primary, or master application, whereas the end user application program 106.2 may be an auxiliary, secondary, or slave application, both relative to each other.

The end user application program 104.2 and the end user application program 106.2 may share a make, a model, a version, or a configuration. For example, the end user application program 104.2 and the end user application program 106.2 may each be a domain specific application program (e.g., a pharmacy application program) and share a make, a model, a version, or a configuration. For example, the end user application program 104.2 and the end user application program 106.2 each be a domain specific application program (e.g., a pharmacy application program) and share the make, but be two different models of same software, where the end user application program 104.2 operates as a main, primary, or master application and the end user application program 106.2 operates as an auxiliary, secondary, or a slave application relative to the end user application program 104.2. For example, the computing terminal 104 may have a form factor of a desktop machine hosting the end user application 104.2 having its identifier and operating as a main, primary, or master application, whereas the computing terminal 106 have a form factor of a tablet machine hosting the end user application program 106.2 having its identifier and operating as an auxiliary, secondary, or slave application relative to the end user application program 104.2, while the end user application program 104.2 and the end user application program 106.2 are logically paired to each other based on respective identifiers being identical in value and format, and where the computing terminal 104 and the computing terminal 106 may be co-positioned in the defined physical area (e.g., same cubicle, same room). For example, the computing terminal 104 and the computing terminal 106 may be physically collocated within the defined physical area. For example, the computing terminal 104 and the computing terminal 106 may be spaced apart from each other at about 1 meter or less, whether on a horizontal plane, a vertical plane, or a diagonal plane, which may allow the computing terminal 104 and the computing terminal 106 to simultaneously be within the physical reach of the hand of the user operating the computing terminal 104 and the computing terminal 106 (e.g., similar to an airplane cockpit). For example, the computing terminal 104 and the computing terminal 106 may be positioned side-by-side each other to simultaneously be within the physical reach of the hand of the user operating the computing terminal 104 and the computing terminal 106 (e.g., similar to an airplane cockpit). For example, the computing terminal 106 may be attached (e.g., via an articulating arm, a stand, a bracket) to the computing terminal 104. For example, the computing terminal 104 and the computing terminal 106 may be disposed on a common surface (e.g., a shelf, a tabletop, a stand). However, note that this configuration is not required and the computing terminal 104 and the computing terminal 106 may be disposed on different surfaces (e.g., one on a shelf and one on a tabletop).

The server 108 may be local to or remote from the computing terminal 104 or the computing terminal 106. The server 108 may be local to or remote from the server 110 or the server 112. The server 108 may be an application server or another suitable server. The server 108 may be operated by an entity different from an entity operating the computing terminal 104, the computing terminal 106, the server 110, the server 112, or the database 114. The server 108, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 108 or the server 108 can operate as the mainframe in some embodiments.

The OS 108.1 may be Windows, Linux, MacOS, Android, iOS, or any other suitable OS.

The routing application program 108.2 runs on the OS 108.1. The routing application program 108.2 may be a message routing program that is programmed to facilitate efficient receiving, processing, and sending messages between various computing systems to enable corresponding transactions to be completed. For example, a transaction may correspond to a single message (one-to-one) or a set of messages (one-to-many). For example, the routing application program 108.2 may be a medical claim application program that is programmed to facilitate efficient receiving, processing, and sending of messages, which embody medical claims by content (e.g., text), submitted by pharmacies to insurance companies or payers. The medical claim application program may have a software logic/UIs programmed to route messages (e.g., medical claims) submitted by pharmacies computing systems to appropriate insurance computing systems or pharmacy benefit manager computing systems based on appropriate insurance coverage and plan information as validated based on contents of those messages. The medical claim application program may have a software logic/UIs programmed to perform initial editing and validation of messages (e.g., medical claims) to ensure that those messages meet a certain required format (if needed) and contain accurate data. The medical claim application program may have a software logic/UIs programmed to perform real-time transacting (e.g., adjudication by approval or denial) of messages (e.g., medical claims) by seamlessly integrating with payers' claims computing processing systems. The medical claim application program may have a software logic/UIs programmed to perform tracking and monitoring of statuses of submitted messages (e.g., medical claims), as well as generating reports and analytics. The medical claim application program may have a software logic/UIs programmed to integrate with existing pharmacy computing management systems, enabling seamless submission of messages (e.g., medical claims) from pharmacy workflows, while minimizing or eliminating manual data entry or separate computing systems.

The routing application program 108.2 may be programmed to convert messages from one data format (e.g., flat file, matrix format, National Council for Prescription Drug Programs (NCPDP) format) to another data format (e.g., structured, delimited, Java Script Object Notation (JSON), Extensible Markup Language (XML), Comma Separated Values (CSV)) or vice versa, although this functionality is not required. For example, the routing application program 108.2 may receive a message (e.g., a request) in one data format and convert the message into another data format before routing further. For example, the message may be received in a flat file data format, a matrix data format, a NCPDP format, or another suitable format. For example, the message may have the format of a flat file format for transmitting messages (e.g., pharmacy claims and related transactions), where the message may contain segments and segments may contain fields, where each field may contain a single data element (e.g., a name, a identifier, a drug code, a quantity), where fields and segments may be separated by non-printable ASCII characters, such as a record separator and a field separator, where the format may support various data types, such as strings, dates, integers, and decimal numbers, where numeric fields can be zero-padded, or use a "signed overpunch" technique to encode negative values. For example, for batch transmission, the format may define headers and trailers to separate multiple transactions within a single file, such as using separators to indicate start of text and end of text. For example, the format may be a flat file format having segments separated by record separators, with fields within segments separated by field separators, supporting different data types using techniques, such as zero-padding and signed overpunch. For example, the format may be NCPDP or another suitable format. However, note that there may be an Application Programming Interface (API) separate and distinct from the routing application program 108.2, external to the routing application program 108.2, although the API may be a component of the routing application program 108.2. As such, the API may be hosted on the server 108, the server 110, the server 112, or another server communicating with the network 102. For example, the API may be logically positioned between the routing application program 108.2 and the rules engine 112.2. For example, the API may be a Representational State Transfer (REST) API, a Simple Object Access Protocol (SOAP) API, or another suitable API. The API may be programmed to receive a message (e.g., a medical claim) from the routing application program 108.2 and convert, similar to above, the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rules engine 112.2 to process the message, as converted (or a copy thereof), as disclosed herein. Likewise, the API may be programmed to receive a message (e.g., an approval or a denial of a medical claim) from the rules engine 112.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 108.2 to process the message, as converted (or a copy thereof), as disclosed herein.

The routing application program 108.2 may be programmed to route messaging based on parsing (e.g., textually) those messages. For example, such routing may occur based on a set of predefined business rules and logic to determine various appropriate paths and destinations for received messages (e.g., medical claims). As such, in context of medical claim processing, the routing application program 108.2 may have a message intake logic (e.g., a software module) that receives messages (e.g., medical claims) from various sources, such as providers, clearinghouses, or other healthcare entities (e.g., formatted pursuant to Electronic Data Interchange (EDI) X12 837). Further, the routing application program 108.2 may have a claim parsing logic (e.g., a software module) that parses (e.g., by text) messages (e.g., medical claims) to extract relevant information (e.g., text), such as patient details, provider information, diagnosis codes, procedure codes, and insurance details. Also, the routing application program 108.2 may have a rule evaluation logic (e.g., a software module) that, based on extracted claim data, evaluates a set of predefined business rules to determine an appropriate routing path. For example, these rules can be based on various factors, such as patient's insurance plan and network affiliations, provider's participation in specific networks or Preferred Provider Organizations (PPOs), geographic location of the provider or patients, claim type (e.g., medical, dental, institutional), presence of specific diagnosis or procedure codes, or other suitable factors. Moreover, the routing application program 108.2 may have a routing destination determination logic (e.g., a software module) that, based on evaluated rules, identifies appropriate destination(s) for routing messages (e.g., medical claims), such as computing systems (e.g., APIs, File Transfer Protocol (FTP) sites, web portals) of payers or insurance companies, third-party administrators, repricing vendors or PPO networks, auditing or review entities, or other suitable destinations. Furthermore, the routing application program 108.2 may have a claim transmission logic (e.g., a software module) that transmits messages (e.g., medical claims) to identified destination(s) using appropriate EDI formats or secure FTP sites, APIs, web portals or other suitable data recipient software. This may involve point-to-point routing (e.g., direct transmission to recipients) or wrap routing (routing through intermediary networks or entities). Also, the routing application program 108.2 may have a tracking and auditing logic (e.g. a software module) that enables maintenance of an audit trail, tracking how messages move among data recipients and status throughout routing processes, such as by monitoring timestamps, recipient information, and any errors or exceptions encountered during routing. Additionally, the routing application program 108.2 may be have an exception handling logic (e.g., a software module) that handles issues or exceptions that may arise during routing (e.g., invalid data, missing information, rule conflicts), which may involve or enable alerts, notifications, or manual intervention workflows to resolve identified issues.

The server 110 may be local to or remote from the computing terminal 104 or the computing terminal 106. The server 110 may be local to or remote from the server 108 or the server 112. The server 110 may be an application server or another suitable server. The server 110 may be operated by an entity different from an entity operating the computing terminal 104, the computing terminal 106, the server 108, the server 112, or the database 114. The server 110, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 110 or the server 110 can operate as the mainframe in some embodiments.

The OS 110.1 may be Windows, Linux, MacOS, Android, iOS, or any other suitable OS.

The routing application program 110.2 runs on the OS 110.1. The routing application program 110.2 may be a message routing program that is programmed to facilitate efficient receiving, processing, and sending messages between various computing systems to enable corresponding transactions to be completed. For example, a transaction may correspond to a single message (one-to-one) or a set of messages (one-to-many). For example, the routing application program 110.2 may be a medical claim application program that is programmed to facilitate efficient receiving, processing, and sending of messages, which embody medical claims by content (e.g., text), submitted by pharmacies to insurance companies or payers. The medical claim application program may have a software logic/UIs programmed to route messages (e.g., medical claims) submitted by pharmacies computing systems to appropriate insurance computing systems or pharmacy benefit manager computing systems based on appropriate insurance coverage and plan information as validated based on contents of those messages. The medical claim application program may have a software logic/UIs programmed to perform initial editing and validation of messages (e.g., medical claims) to ensure that those messages meet a certain required format (if needed) and contain accurate data. The medical claim application program may have a software logic/UIs programmed to perform real-time transacting (e.g., adjudication by approval or denial) of messages (e.g., medical claims) by seamlessly integrating with payers' claims computing processing systems. The medical claim application program may have a software logic/UIs programmed to perform tracking and monitoring of statuses of submitted messages (e.g., medical claims), as well as generating reports and analytics. The medical claim application program may have a software logic/UIs programmed to integrate with existing pharmacy computing management systems, enabling seamless submission of messages (e.g., medical claims) from pharmacy workflows, while minimizing or eliminating manual data entry or separate computing systems.

The routing application program 110.2 may be programmed to convert messages from one data format (e.g., flat file, matrix format, NCPDP format) to another data format (e.g., structured, delimited, JSON, XML, CSV) or vice versa, although this functionality is not required. For example, the routing application program 110.2 may receive a message (e.g., a request) in one data format and convert the message into another data format before routing further. For example, the message may be received in a flat file data format, a matrix data format, a NCPDP format, or another suitable format. For example, the message may have the format of a flat file format for transmitting messages (e.g., pharmacy claims and related transactions), where the message may contain segments and segments may contain fields, where each field may contain a single data element (e.g., a name, a identifier, a drug code, a quantity), where fields and segments may be separated by non-printable ASCII characters, such as a record separator and a field separator, where the format may support various data types, such as strings, dates, integers, and decimal numbers, where numeric fields can be zero-padded, or use a "signed overpunch" technique to encode negative values. For example, for batch transmission, the format may define headers and trailers to separate multiple transactions within a single file, such as using separators to indicate start of text and end of text. For example, the format may be a flat file format having segments separated by record separators, with fields within segments separated by field separators, supporting different data types using techniques, such as zero-padding and signed overpunch. For example, the format may be NCPDP or another suitable format. However, note that there may be an API separate and distinct from the routing application program 110.2, external to the routing application program 110.2, although the API may be a component of the routing application program 110.2. As such, the API may be hosted on the server 108, the server 110, the server 112, or another server communicating with the network 102. For example, the API may be logically positioned between the routing application program 110.2 and the rules engine 112.2. For example, the API may be a REST API, a SOAP API, or another suitable API. The API may be programmed to receive a message (e.g., a medical claim) from the routing application program 108.2 and convert, similar to above, the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rules engine 112.2 to process the message, as converted (or a copy thereof), as disclosed herein. Likewise, the API may be programmed to receive a message (e.g., an approval or a denial of a medical claim) from the rules engine 112.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 110.2 to process the message, as converted (or a copy thereof), as disclosed herein.

The routing application program 110.2 may be programmed to route messaging based on parsing (e.g., textually) those messages. For example, such routing may occur based on a set of predefined business rules and logic to determine various appropriate paths and destinations for received messages (e.g., medical claims). As such, in context of medical claim processing, the routing application program 110.2 may have a message intake logic (e.g., a software module) that receives messages (e.g., medical claims) from various sources, such as providers, clearinghouses, or other healthcare entities (e.g., formatted pursuant to EDI X12 837). Further, the routing application program 110.2 may have a claim parsing logic (e.g., a software module) that parses (e.g., by text) messages (e.g., medical claims) to extract relevant information (e.g., text), such as patient details, provider information, diagnosis codes, procedure codes, and insurance details. Also, the routing application program 110.2 may have a rule evaluation logic (e.g., a software module) that, based on extracted claim data, evaluates a set of predefined business rules to determine an appropriate routing path. For example, these rules can be based on various factors, such as patient's insurance plan and network affiliations, provider's participation in specific networks or PPOs, geographic location of the provider or patients, claim type (e.g., medical, dental, institutional), presence of specific diagnosis or procedure codes, or other suitable factors. Moreover, the routing application program 110.2 may have a routing destination determination logic (e.g., a software module) that, based on evaluated rules, identifies appropriate destination(s) for routing messages (e.g., medical claims), such as computing systems (e.g., APIs, FTP sites, web portals) of payers or insurance companies, third-party administrators, repricing vendors or PPO networks, auditing or review entities, or other suitable destinations. Furthermore, the routing application program 110.2 may have a claim transmission logic (e.g., a software module) that transmits messages (e.g., medical claims) to identified destination(s) using appropriate EDI formats or secure FTP sites, APIs, web portals or other suitable data recipient software. This may involve point-to-point routing (e.g., direct transmission to recipients) or wrap routing (routing through intermediary networks or entities). Also, the routing application program 110.2 may have a tracking and auditing logic (e.g. a software module) that enables maintenance of an audit trail, tracking how messages move among data recipients and status throughout routing processes, such as by monitoring timestamps, recipient information, and any errors or exceptions encountered during routing. Additionally, the routing application program 110.2 may be have an exception handling logic (e.g., a software module) that handles issues or exceptions that may arise during routing (e.g., invalid data, missing information, rule conflicts), which may involve or enable alerts, notifications, or manual intervention workflows to resolve identified issues.

Although FIG. 1 shows the server 108 hosting the OS 108.1 running the routing application program 108.2 and the server 110 hosting the OS 110.1 running the routing application program 110.2, this configuration is not required. As such, either the server 108 hosting the OS 108.1 running the routing application program 108.2 or the server 110 hosting the OS 110.1 running the routing application program 110.2 may be omitted, with what is remaining performing similar or same functionality, as disclosed herein. Alternatively, the server 108 hosting the OS 108.1 running the routing application program 108.2 and the server 110 hosting the OS 110.1 running the routing application program 110.2 may be one server hosting an OS running a routing application program, as disclosed herein. Note that there may be three or more routing application programs respectively running on three or more OS respectively hosted on three or more servers to perform various methods, as disclosed herein. Likewise, note that two or more routing application programs may run on one OS hosted on one server to perform various methods, as disclosed herein.

The server 112 is remote from or local to the computing terminal 104 or the computing terminal 106. The server 112 may be remote from or local to the server 108 or the server 110. The server 112 may be an application server or another suitable server. The server 108 may be operated by an entity different from an entity operating the computing terminal 104 or the server 106.

The OS 112.1 may be Windows, Linux, MacOS, Android, iOS, or any other suitable OS.

The rules engine 112.2 runs on the OS 112.1. The rules engine 112.2 may be a software system (e.g., a software logic, an application program, a software module) that executes business rules in a runtime environment by business users (from computing terminals) to define, manage, and automate decision-making processes based on predefined rules. For example, the rules engine 112.2 may be a task-dedicated software logic that can be started, stopped, or paused. For example, in context of medical claim processing, the rule engine 112.2 may enable automating of evaluation and adjudication of transactions based on messages (e.g., medical claims) input thereinto based on various criteria and policies, as set over the network 102 by computing terminals operated by business users.

As mentioned above, there may be an API separate and distinct from the routing application program 108.2 or the routing application program 110.2, external to the routing application program 108.2 or the routing application program 110.2, although the API may be a component of the routing application program 108.2 or the routing application program 110.2. For example, the rules engine 112.2 may host the API or the API may be separate and distinct from the rules engine 112.2, external to the rules engine 112.2. As such, the API may be hosted on the server 108, the server 110, the server 112 or another server communicating with the network 102. For example, the API may be logically positioned between the routing application program 108.2 or the routing application program 110.2 and the rules engine 112.2. For example, the API may be a REST API, a SOAP API, or another suitable API. The API may be programmed to receive a message (e.g., a medical claim) from the routing application program 108.2 or the routing application program 110.2 and convert the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rules engine 112.2 to process the message, as converted (or a copy thereof), as disclosed herein. Likewise, the API may be programmed to receive a message (e.g., an approval or a denial of a medical claim) from the rules engine 112.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 108.2 or the routing application program 110.2 to process the message, as converted (or a copy thereof), as disclosed herein.

The rules engine 112.2 may have (i) a rule repository (e.g., a database) programmed to store rules, (ii) a rule editor (e.g., a UI) programmed to define, modify, and organize rules using natural language or domain-specific languages as accessed from a computing terminal, (iii) a rule execution logic (e.g., a software architecture, a software module) programmed to interpret and evaluate various business rules against input data or scenarios (e.g., applying rules and generating appropriate outcomes), and (iv) an integration interface (e.g., a software architecture, a software module) programmed to communicably integrate with other computing systems (e.g., EHR software, medical claim management software), to access relevant data and share those results. For example, in context of medical claim processing, the rules engine 112.2 may be used to automate various decision-making processes based on predefined rules. For example, some of such rules may be (i) claim eligibility rules (e.g., if a patient's policy is not active or has expired, then reject this claim), (ii) medical coding rules (e.g., if a medical coding on a claim contains an invalid or inconsistent combination of codes, then flag the claim for review), (iii) benefit limit rules (e.g., if a claim requests an amount that exceeds an annual or lifetime benefit limit for a patient's policy, then reject or partially approve the claim), (iv) pre-existing condition rules (e.g., if a claim for a patient is related to a pre-existing condition and the patient is within his waiting period, then reject the claim), (v) claim adjudication rules (e.g., calculate a patient's deductible, co-pay, and coinsurance amounts based on a set of policy terms), (vi) compliance and regulatory rules (e.g., ensure that a claim adheres to relevant healthcare regulations, coding guidelines, and billing practices).

Some examples of business rules executable by the rules engine 112.2 may include business rules for authorization processes, workflow processes, messaging processes, e-payment processes, and other suitable processes. Some business rules may be based on Boolean logic and include if-then (or other suitable) statements, whether standalone, chained, branched, or otherwise. Some business rules may enable enrichment of messages (e.g., medical claims) by metadata, such as descriptive metadata, preservation metadata, structural metadata, provenance metadata, definitional metadata, administrative metadata, computational transaction metadata, or other suitable metadata. For example, in context of medical claim processing, the descriptive metadata may be information that describes contents and key attributes of medical claims data to aid in identification, organization, and discovery of medical claims within databases or repositories, such as claim identifiers, patient name, date of service, provider name, diagnosis codes, procedure codes, billing codes, and claim status. For example, in context of medical claim processing, the preservation metadata may be information that supports and documents long-term preservation and accessibility of electronic medical claims data, such as technical details about file formats, software, fixity information (e.g., checksums, digital signatures), chain of custody, data transformations, data permissioning, data migration, and systems used to create and manage medical claims data. For example, in context of medical claim processing, the structural metadata may be information that describes organization, structure, and relationships within medical claims data, such as internal structure and components of messages (e.g., medical claims), different sections or fields within data structures (e.g., documents, files), different data elements within messages (e.g., medical claims), such as linking diagnosis codes to specific procedure identifiers or service identifiers, different connections between messages (e.g., medical claims) and related documents or files, such as supporting medical records, attachments, or supplemental information, hierarchical structure of claims data, such as how individual messages (e.g., medical claims) are organized within larger claim batches or submissions, different file formats, data types, and technical specifications used to store and transmit medical claims data, different data integrations by mapping structures of claims data to standardized data models or schemas used in claims processing systems. For example, in context of medical claim processing, the provenance metadata may be information that tracks origin, history, and lineage of medical claims data by providing detailed audit trails of data sources, transformations, and processes involved in creation/handling of messages (e.g., medical claims), such as identifiers of healthcare providers, insurance companies that generated initial claims data, information about computing systems, applications, and tools used to process, transform, or transmit messages (e.g., medical claims) at various stages, sequences of actions, processes, and any modifications applied to claims data, establishing clear data lineages, identifies user profiles permissioned for creating, modifying, or approving messages (e.g., medical claims) at different points in time, various timestamps and versioning information to reconstruct the chronological history of changes to messages (e.g., medical claims). For example, in context of medical claim processing, the definitional metadata may be information that indicates meaning and semantics of data elements within messages (e.g., medical claims), such as definitions or descriptions of codes (e.g., International Classification of Diseases (ICD), Current Procedural Terminology (CPT), National Drug Code (NDC)) used in claims, explanations of terminology or abbreviations used in data fields within messages (e.g., medical claims), data dictionaries or glossaries that provide precise meaning of data elements like claim types, billing statuses, or provider specialties, details on how specific data values are calculated or derived, such as claim payment amounts based on coverage rules, mappings between coded values in claims and their textual descriptions or labels, and business rules or validation criteria that define acceptable values or formats for claims data. For example, in context of medical claim processing, the administrative metadata may be structured data elements that provide essential information about medical services rendered, patient details, provider information, and billing codes to enable accurate claims processing, reimbursement, and data analysis. The administrative metadata may include patient information (e.g., patient name, date of birth, gender, address, insurance policy number, group number, patient medical record number), provider information (e.g., provider name, National Provider Identifier (NPI), provider specialty, taxonomy codes, provider address, contact information), service details (e.g., service date(s), diagnosis codes (e.g., ICD codes) describing patient's condition, procedure codes (e.g., CPT codes) for services rendered, service location), billing information (e.g., charges for each service, modifiers for procedures, place of service codes, rendering provider information). For example, the administrative metadata can be on standardized claim forms, such as CMS-1500 or UB-04, or in EDI formats, such as X12 837. For example, in context of medical claim processing, the computational transaction metadata may be information (e.g., textual, structured, unstructured, descriptive) that provides context and details beyond a basic transaction information, such as sender, receiver, and an amount of payments indicated or stated to be transferred. This information may enhance at least some efficiency, accuracy, and automation of claim (e.g., message) processing. For example, the computational transaction metadata may include patient or provider demographics, such as a member identification number (e.g., a unique identifier for a patient), a national provider identifier (e.g., a unique identifier for a healthcare providers), a claim reference number (e.g., a unique identifier for each claim, facilitating tracking and re-association of attachments with the correct transaction. For example, the computational transaction metadata may include transaction details, such as service dates, procedure codes (e.g., standardized codes, CPT, ICD or others that describe medical procedures and diagnoses), billing information (e.g., details about various costs associated with various services provided). For example, the computational transaction metadata may include attachments and documentation, such as electronic attachments (e.g., documents, medical records, lab results, and imaging reports that support a particular claim and metadata may help in re-association of these attachments with corresponding claims) and reference numbers (e.g., link attachments to correct administrative transactions to reducing manual intervention). For example, the computational transaction metadata may include policy and authorization data, such as pre-authorization information (e.g., data regarding prior approvals for specific treatments or procedures) and policy details (e.g., information about patient's insurance coverage including limits and exclusions). For example, the computational transaction metadata may include security and compliance information, such as encryption and digital signatures or audit trails (e.g., metadata that tracks who accessed or modified a data item to ensure compliance with regulations like HIPAA). Therefore, the computational transaction metadata may improve accuracy (e.g., reducing errors in matching information), automation (e.g., providing structured data for interpretation by machine learning or other automation software), and data management (e.g., organization of large volumes of data to efficiently expedite workflow), while staying compliant with regulatory requirements, protective sensitive information and ensuring secure transactions. As such, the rules engine 112.2 may be programmed to enrich messages (e.g., medical claims) with various metadata for application via the business rules.

The database 114 may be a relational database, a graph database, a vector database, a multi-model database or another suitable database. The rules engine 112.2 is programmed to interface (e.g., read, write, delete, query, retrieve, store, search) with the database 114. The database 114 is shown to be hosted off the server 112, which may be on another server (e.g., a database server hosting a DBMS) to provide modularity. However, note that this configuration is not required and the server 112 may host the database 114 such that the database 114 runs on the OS 112.1, which may enable the rules engine 112.2 to apply rules more efficiently (e.g., faster).

The database 114 may have a schema (e.g., flat, hierarchical, network, relational, star, snowflake) according to which the database 114 stores its records. For example, in context of medical claim processing, the database 114 may have a set of tables (e.g., related to each other by a primary key) storing data (e.g., textual, structured, unstructured, descriptive) for configurations of patient profiles (e.g., personal information, medical history), a set of tables (e.g., related to each other by a primary key) storing data (e.g., textual, structured, unstructured, descriptive) for configurations of payor profiles (e.g., policy information, policy limits), a set of tables (e.g., related to each other by a primary key) storing data (e.g., textual, structured, unstructured, descriptive) for configurations of prescription profiles (e.g., dosages, side effects), a set of tables (e.g., related to each other by a primary key) storing data (e.g., textual, structured, unstructured, descriptive) for configurations of prescriber profiles (e.g., personal information, prescription history), a set of tables (e.g., related to each other by a primary key) storing data (e.g., textual, structured, unstructured, descriptive) for configurations of product profiles (e.g., name, dosages), a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other by a primary key) storing data (e.g., textual, structured, unstructured, descriptive) for configurations of place of service profiles (e.g., a set of attributes descriptive of a physical pharmacy). At least two of these sets of tables may be related to each other (e.g., via a primary key).

The database 114 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Figure 2:
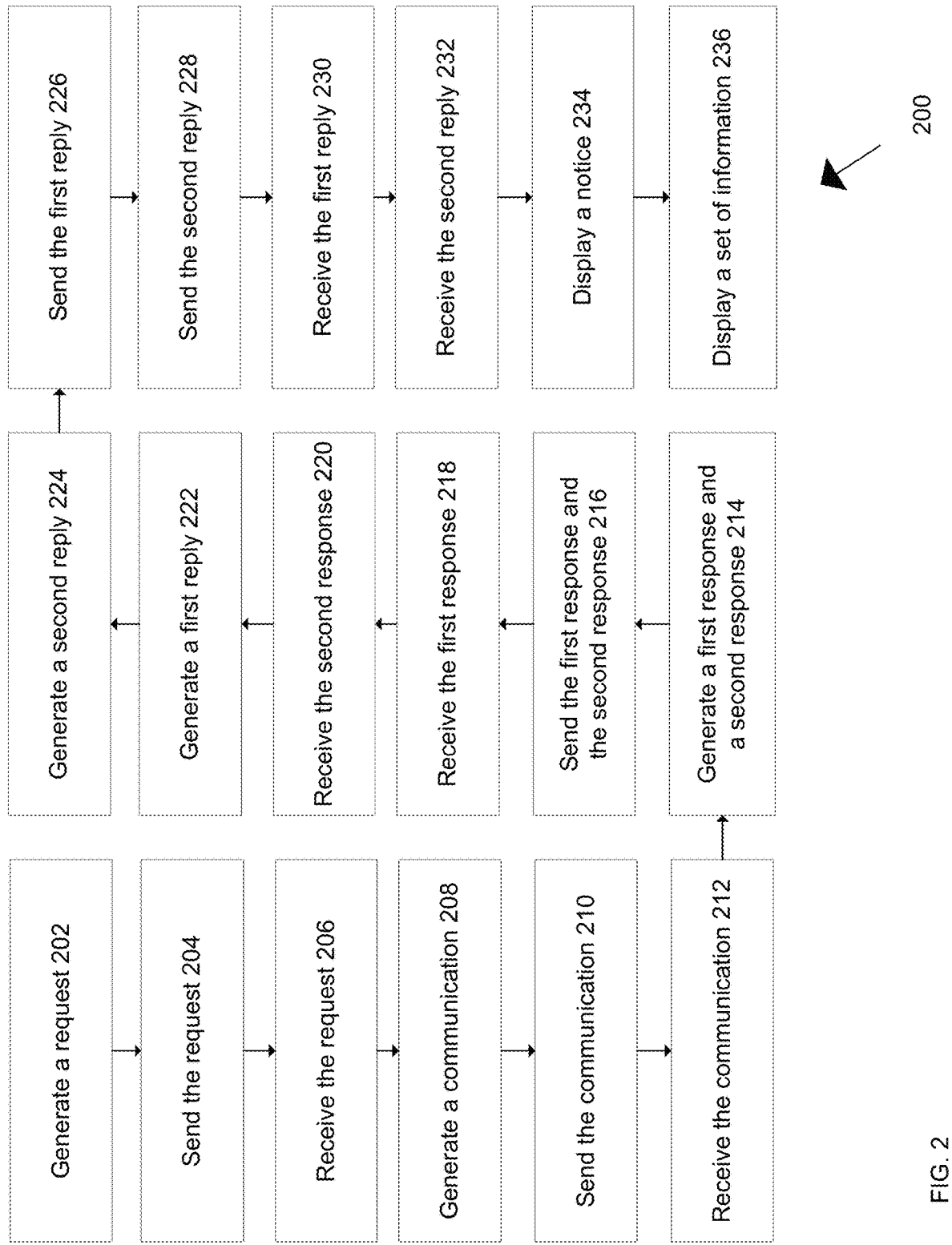
FIG. 2 shows a flowchart of an embodiment of a method for enabling handoff continuity between computing terminals using the system of FIG. 1 according to this disclosure.

FIG. 2 shows a flowchart of an embodiment of a method for enabling handoff continuity between computing terminals using the system of FIG. 1 according to this disclosure. In particular, there is a process 200 having a set of blocks 202-236 performed by the system 100, as explained above. As such, the system 100 includes a first computing terminal 104 hosting a first end user application program 104.2 (e.g., a pharmacy application program) associated with a first identifier and operated by a user (e.g., a pharmacist or a pharmacy technician). The system 100 includes a second computing terminal 106 hosting a second end user application program 106.2 (e.g., a pharmacy application program) associated with a second identifier identical to the first identifier in value (e.g., equal in value) and operated by the user. For example, the first end user application program 104.2 may be a main, primary, or master application, whereas the end user application program 106.2 may be an auxiliary, secondary, or slave application, both relative to each other. For example, the first computing terminal 104 may be connected to the network 102 over a first type of connection (e.g., LAN) and the second computing terminal 104 may be connected to the network 102 over a second type of connection (e.g., cellular), although this configuration is not required and the first computing terminal 104 and the second computing terminal 106 may be connected to the network 102 over one type of connection (e.g., LAN). The system 100 includes a first server 108 hosting a first routing application program 108.2, a second server 110 hosting a second routing application program 110.2 and a third server 112 hosting a rules engine 112.2 containing a set of rules. Although FIG. 1 shows the server 108 hosting the OS 108.1 running the routing application program 108.2 and the server 110 hosting the OS 110.1 running the routing application program 110.2, this configuration is not required. As such, either the server 108 hosting the OS 108.1 running the routing application program 108.2 or the server 110 hosting the OS 110.1 running the routing application program 110.2 may be omitted, what is remaining performing similar or same functionality, as disclosed herein. Alternatively, the server 108 hosting the OS 108.1 running the routing application program 108.2 and the server 110 hosting the OS 110.1 running the routing application program 110.2 may be one server hosting an OS running a routing application program, as disclosed herein. Note that there may be three or more routing application programs respectively running on three or more OS respectively hosted on three or more servers to perform various methods, as disclosed herein. Likewise, note that two or more routing application programs may run on one OS hosted on one server to perform various methods, as disclosed herein.

In block 202, the first end user application program 104.2 generates a request (e.g., a message containing an alphanumeric content expressing a medical claim) associated with a profile (e.g., a patient profile) in context of a transaction (e.g., an approval or a denial of the request) involving the profile. The request may be generated based on an input (e.g., a physical or virtual keyboard, a microphone, a camera) from the user operating the first end user application program 104.2 in a locale (e.g., a room, a building, a pharmacy, a hospital) or received from a data source (e.g., an API, an FTP site) over the network 102. For example, when the first end user application program 104.2 is the browser application program, then the browser application program may be logged into a web-based pharmacy application program over the network 102 to generate the request, where the web-based pharmacy application program is hosted in a server remote from the first computing terminal 104, the second computing terminal 106, the first server 108, the second server 110, the third server 112, and the database 110. For example, when the first end user application program 104.2 is the pharmacy application program, then the pharmacy application program generates the request. The request may have various data (e.g., alphanumeric contents), such as patient data, medication data, dosage data, insurance data, or other suitable data, according to what is described in context of FIG. 1. For example, the request may be formatted in a data format, such as a flat data file, an NCPDP format, a matrix format, or another suitable format.

The second identifier may be identical to the first identifier in value (e.g., equal in value) based on an input (e.g., from the user operating an input device such as a keyboard or a cursor control device) of the first identifier into the second end user application program 106.2, before the first end user application program 104.2 generates the request. Such identity may persist throughout the process 200 based on the first end user application program 104.2 and the second end user application program 106.2 being paired to each other via the pairing application program enforcing such pairing or the first end user application program 104.2 and the second end user application program 106.2 may be paired to each other by the computing terminal 104 and the computing terminal 106 being paired to each other over the PAN connection (e.g., Bluetooth) based on the identifier of the end user application program 104.2 being identical in value (e.g., equal in value) to the identifier of the end user application program 106.2. As such, if the computing terminal 104 and the computing terminal 106 are not paired to each other (e.g., too far apart to enforce the identifiers being equal in value), then the end user application program 104.2 and the end user application program 106.2 may not be paired to each other. Note that the second identifier being identical to the first identifier in value (e.g., equal in value) may persist for the transaction and other subsequent requests or transactions, whether related to the profile or not related to the profile (e.g., for other patient profiles).

In block 204, the first end user application program 104.2 sends the request (or a copy thereof) to the first routing application program 108.2 over the network 102 from the computing terminal 104 to the server 108. Before such sending, the first end user application program 104.2 may convert or format the request in a data format, such as a flat data file, an NCPDP format, a matrix format, or another suitable format.

In block 206, the first routing application program 108.2 receives the request (or a copy thereof) from the first end user application program 104.2 over the network 102 from the computing terminal 104 at the server 108. The request may be received formatted in a data format, such as a flat data file, an NCPDP format, a matrix format, or another suitable format.

In block 208, the first routing application program 108.2 generates a communication (e.g., a message) based on the request. Such generation may contain information sourced (e.g. copied) from the request and involve the first routing application program 106.2 determining where to route the communication over the network 102 based on information sourced from the request, according to what is described in context of FIG. 1. Further, such generation may sometimes involve converting or formatting the communication in a data format different from how the request is formatted when received from the first end user application program 104.2. For example, such conversion or formatting may be into a delimited format, a hierarchical format, a tree format, a graph format, a CSV format, a JSON format, an XML format, or another suitable format. For example, if the request was received formatted in a data format, such as a flat data file, a NCPDP format, a matrix format, or another suitable format, then the communication may be converted to be formatted in a delimited format, a hierarchical format, a tree format, a graph format, a CSV format, a JSON format, an XML format, or another suitable format.

In block 210, the first routing application program 108.2 sends the communication (or a copy thereof) to the rules engine 112.2 over the network 102 from the server 108 to the server 112. Before such sending, the first routing application program 108.2 or an API, as mentioned above, may or may not convert the communication from its format (e.g., NCPDP) or convert the communication into another format (e.g., structured) if needed. Note that the request may be formatted in a first format and the communication may be formatted in a second format.

In block 212, the rules engine 112.2 receives the communication (or a copy thereof) from the first routing application program 108.2 over the network 102 from the server 108 at the server 112. The communication may be received formatted in a data format as originally sent by the first routing application program 108.2, whether converted or not. At this point, the rules engine 112.2 contains a set of business rules, which may be set by a computing terminal (e.g., a desktop computer, a laptop computer), according to what is described in context of FIG. 1. For example, the set of business rules may enable grant of an approval (whether full or partial) or a denial (whether full or partial) of the transaction based on or involving the request. For example, the rules engine 112.2 may be programed for the set of business rules to be forward-chaining (e.g., processing condition-action rules) or reactive (e.g., detecting and reacting to events and patterns). As such, the rules engine 112.2 receives the communication (or a copy thereof) and determines whether at least one rule of the set of rules is applicable to the communication. For example, the rules engine 112.2 may receive the communication (or a copy thereof) from the routing application program 108.2 through an API, as mentioned above. As such, the rules engine 112.2 may receive the communication (or a copy thereof) converted by the API from one data format (e.g., NCPDP format) to another data format (e.g., structured format).

In block 214, the rules engine 112.2 generates a first response (e.g., a message) based on the communication being determined by the rules engine 112.2 to be applicable to at least one rule of the set of business rules, as the first identifier and the second identifier are identical to each other in value (e.g., equal in value), and a second response (e.g., a message) based on the communication being determined by the rules engine 112.2 to be applicable to at least one rule of the set of business rules, as the first identifier and the second identifier are identical to each other in value (e.g., equal in value). For example, based on the communication being determined by the rules engine 112.2 to be applicable to at least one rule of the set of business rules, there may be the approval (partial or full) of the transaction by the rules engine 112.2. For example, the rules engine 112.2 may determine the communication may be applicable to the set of business rules based on sourcing (e.g., copying) information (e.g. alphanumeric content in fields) from the communication and attempting to apply such information to the set of business rules by a Boolean logic. Note that during or to enable the rules engine 112.2 to determine whether at least one rule of the set of business rules is applicable to the communication, the rules engine 112.2 may access various metadata, as described in context of FIG. 1, to enrich (e.g., augment, supplement) the communication and then query the database 114, if needed, for more relevant or additional information to determine whether the set of business rules is applicable to the communication. One example of this is disclosed in context of FIG. 3.

The rules engine 112.2 may generate the first response and the second response simultaneously, the first response before the second response, or the first response after the second response. The first response contains a handoff continuity notice (e.g., an invitation, a prompt, an indication, a signal) in context of the transaction to access the second end user application program 106.2 in context of the transaction based on the set of business rules being applicable to the communication. For example, the handoff continuing notice may signal the user to access the second response output (e.g., a text, an image, a sound, a vibration) via the second end user application program 106.2 in context of the transaction based on the set of business rules being applicable to the communication. The second response contains a set of information (e.g., a text, an image, a sound) associated the profile and the request in context of the transaction based on the set of business rules being applicable to the communication. For example, the second response may indicate the transaction being approved by the rules engine 112.2. For example, the set of information may be a URL, which may be a tokenized URL associated with the transaction. For example, the set of information may be an image, which may host or be associated with the URL associated with the transaction. For example, the set of information may include a text, whether structured or unstructured, containing the URL associated with the transaction. Note that such generation may involve converting or formatting the first response or the second response in a data format similar or same to how the communication is formatted when the rules engine 112.2 received the communication. For example, such data format may be a delimited format, a hierarchical format, a tree format, a graph format, a CSV format, a JSON format, an XML format, or another suitable format.

In block 216, the rules engine 112.2 sends the first response (or a copy thereof) to the first routing application program 108.2 and the second response (or a copy thereof) to the second routing application program 110.2 over the network 102 from the server 112 to the server 108 and the server 110. For example, the rules engine 112.2 may send the first response (or a copy thereof) or the second response (or a copy thereof) to the routing application program 108.2 or the routing application program 110.2 through an API, as mentioned above. The rules engine 112.2 may send the first response and the second response simultaneously, the first response may before the second response, or the first response after the second response. Note that the rules engine 112.2 may send the first response (or a copy thereof) and the second response (or a copy thereof) to one routing application program 108.2 or 110.2 if there is one routing application program 108.2 or 110.2, as disclosed herein.

In block 218, the first routing application program 108.2 receives the first response (or a copy thereof) from the rules engine 112.2 over the network 102 from the server 112 to the server 108. For example, the routing application program 108.2 may receive the first response (or a copy thereof) from the rules engine 112.2 through an API, as mentioned above. As such, the routing application program 108.2 may receive the first response (or a copy thereof) converted by the API from one data format (e.g., structured format) to another data format (e.g., NCPDP format).

In block 220, the second routing application program 110.2 receives the first response (or a copy thereof) from the rules engine 112.2 over the network 102 from the server 112 to the server 110. For example, the routing application program 110.2 may receive the second response (or a copy thereof) from the rules engine 112.2 through an API, as mentioned above. As such, the routing application program 110.2 may receive the second response (or a copy thereof) converted by the API from one data format (e.g., structured format) to another data format (e.g., NCPDP format). Note that the block 220 may occur before, after, or simultaneously with the block 218.

In block 222, the first routing application program 108.2 generates a first reply (e.g., a message) to the request submitted from the first end user application program 104.2 to the first routing application program 108.2, where the first reply is generated based on information (e.g., text, images) sourced (e.g., copied) from the first response. The first reply contains the handoff continuity notice (e.g., an invitation, a prompt, an indication, a signal) in context of the transaction to access the second end user application program 106.2 in context of the transaction based on the set of business rules being applicable to the communication. For example, the handoff continuing notice may signal the user to access the second response output (e.g., a text, an image, a sound, a vibration) via the second end user application program 106.2 in context of the transaction based on the set of business rules being applicable to the communication. Further, such generation may involve converting or formatting the first reply in a data format similar or same to how the request is formatted when the first routing application program 108.2 received the first request. For example, such data format may be a flat data file, an NCPDP format, a matrix format, or another suitable format.

In block 224, the second routing application program 110.2 generates a second reply (e.g., a message) to the request submitted from the first end user application program 104.2 to the first routing application program 108.2, where the second reply is generated based on information (e.g., text, images) sourced (e.g., copied) from the second response. The second reply contains the set of information (e.g., a text, an image, a sound) associated the profile and the request in context of the transaction based on the set of business rules being applicable to the communication. For example, the second response may indicate the transaction being approved by the rules engine 112.2. Note that the block 224 may occur before, after, or simultaneously with the block 222. Note that the first response or the second response may be formatted in a first format and the first reply or the second reply may be formatted in a second format. Likewise, note that at least one of the request, the first reply, or the second reply may be formatted as a data file containing a set of segments where the set of segments contains a set of fields where each field in the set of fields contains a single data element associated with the profile where the set of fields and the set of segments are separated by a set of alphanumeric characters. For example, the data file may be compliant with a NCPDP format.

In block 226, the first routing application program 108.2 sends (e.g., pushes, pulls) the first reply to the first end user application program 104.2 over the network 102 from the server first 108 to the first computing terminal 104. Before such sending, the first routing application program 108.2 may convert or format the first reply in a data format similar or same to how the request is formatted when the first routing application program 108.2 received the request. For example, such data format may be a flat data file, an NCPDP format, a matrix format, or another suitable format.

In block 228, the second routing application program 110.2 sends (e.g., pushes, pulls) the second reply to the second end user application program 106.2 over the network 102 from the second server 110 to the second computing terminal 106. For example, the second routing application program 110.2 may send the second reply to the second end user application program 106.2 by pushing the second reply to the second end user application program 106.2 over the network 102 from the second server 110 to the computing terminal 106. Before such sending, the second routing application program 110.2 may convert or format the first reply in a data format similar or same to how the request is formatted when the second routing application program 110.2 received the request. For example, such data format may be a flat data file, an NCPDP format, a matrix format, or another suitable format. Note that the block 228 may occur before, after, or simultaneously with the block 226.

In block 230, the first end user application program 104.2 receives the first reply from the first routing application program 108.2 over the network 102 from the server 108 at the first computing terminal 104.

In block 232, the second end user application program 106.2 receives the second reply from the second routing application program 110.2 over the network 102 from the server 110 at the second computing terminal 104. Note that the block 232 may occur before, after, or simultaneously with the block 230.

In block 234, the first end user application program 104.2 outputs the handoff continuity notice in context of the transaction based on the first identifier and the second identifier being identical to each other in value (e.g., equal in value) responsive to the first end user application program 104.2 sending the request to the first routing application program 108.2. The handoff continuity notice may be a text notification (e.g., "look at your paired application") to access the second end user application program 106.2, an image notification (e.g., a colored symbol) to access the second end user application program 106.2, a sound notification (e.g., a chime) to access the second end user application program 106.2, a vibratory notification, or any other suitable modality of notification. The first end user application program 104.2 may output the handoff continuity notice as an outermost window or present (e.g., display) the handoff continuity notice in a visually distinct manner (e.g., color-coded). Since the first computing terminal 104 or the first end user application program 104.2 may be secured (e.g., locked, firewalled) against outputting, selecting, or clicking the set of information in the first end user application program 104.2, the handoff continuity notice enables the transaction to be handed off to the second end user application program 106.2 to be continued there, whether as approved or to get approval.

In block 236, the second end user application program 106.2 outputs the set of information associated with the profile and the request in context of the transaction according to the handoff continuity notice based on the first identifier and the second identifier being identical to each other in value (e.g., equal in value) responsive to the first end user application program 104.2 sending the request to the first routing application program 108.2. The second end user application program 106.2 may present (e.g., display) the set of information after a user login into the second end user application program 106.2, although this configuration is not required. For example, the user login may include at least one of a biometric content or a two-factor authentication. The first computing terminal 104 and the second computing terminal 106 may be physically collocated within a defined physical area (e.g., a cubicle, a room). The set of information may be an image, which may host or be associated with a URL associated with the transaction, or a URL, which may be a tokenized URL associated with the transaction. For example, the set of information may include a text, whether structured or unstructured, containing the URL associated with the transaction. For example, the URL may be activated (e.g., clicked) at the second end user application program 106 to present a web page of a web portal facilitating a session (e.g., secure, one-time) customized to the transaction, which may request an input from the user to further approvals or processing. For example, the web portal may be hosted a server different from the first server 108, the second server 110, or the third server 112. Note that the block 234 may occur before, after, or simultaneously with the block 236. Since the first computing terminal 104 or the first end user application program 104.2 may be secured (e.g., locked, firewalled) against outputting the set of information in the first end user application program 104.2, the set of information associated with the profile and the request in context of the transaction according to the handoff continuity notice based on the first identifier and the second identifier being identical to each other in value (e.g., equal in value) responsive to the first end user application program 104.2 sending the request to the first routing application program 108.2 enables the transaction to be continued, whether as approved or to get approval.

Therefore, the process 200 improves computer functionality and is technologically beneficial, because of its enablement of the transaction to be requested (e.g., started) in the first end user application 104.2 program by the user, but continuing in the second application end user application program 106.2 operated by the user, when the first end user application program 104.2 is secured (e.g., locked, firewalled) to avoid displaying, selecting, or clicking the set of information, the first identifier remains identical in value (e.g., equal) to the second identifier (e.g., to enforce data security), the handoff continuity notice is output via the first end user application program 104.2, and the set of information is output via the second end user application program 106.2. For example, from the block 202 to the block 236, there may be about 5 seconds or less (e.g., about 4 seconds, 3 seconds, 2 seconds, or 1 second), i.e., the transaction may be approved in about 5 seconds or less.

In context of the block 214, if the rules engine 112.2 determines that the communication is not applicable to at least one rule of the set of business rules, then the second response may contain an indication thereof, which may be a denial (partial or full) of the transaction. As such, the set of information may indicate the user to restart the transaction from the second end user application program 106.2 or the first end user application program 104.2. Alternatively, the set of information may contain a help content (e.g., text, images, sounds) informing the user how to continue the transaction from the second end user application program 106.2 or the first end user application program 104.2 to get the transaction ultimately approved. For example, the help content may hint, disclose or indicate why such denial was made (e.g., what business rule was triggered, missing information, incorrect information) or what information or action can remedy the denial (e.g., provide information on X, correct information Y). For example, this information or action can help the user operating the first end user application program 104.2 or the second end user application program 106.2 to get the transaction approved. The help content may be or operate as a software wizard to guide the user of the first end user application program 104.2 or the second end user application program 106.2 to get the request ultimately approved. This process can iterate several times until a threshold is satisfied (e.g., a preset amount of loops allowed) or continue indefinitely to attempt in getting the transaction approved.

Figure 3:
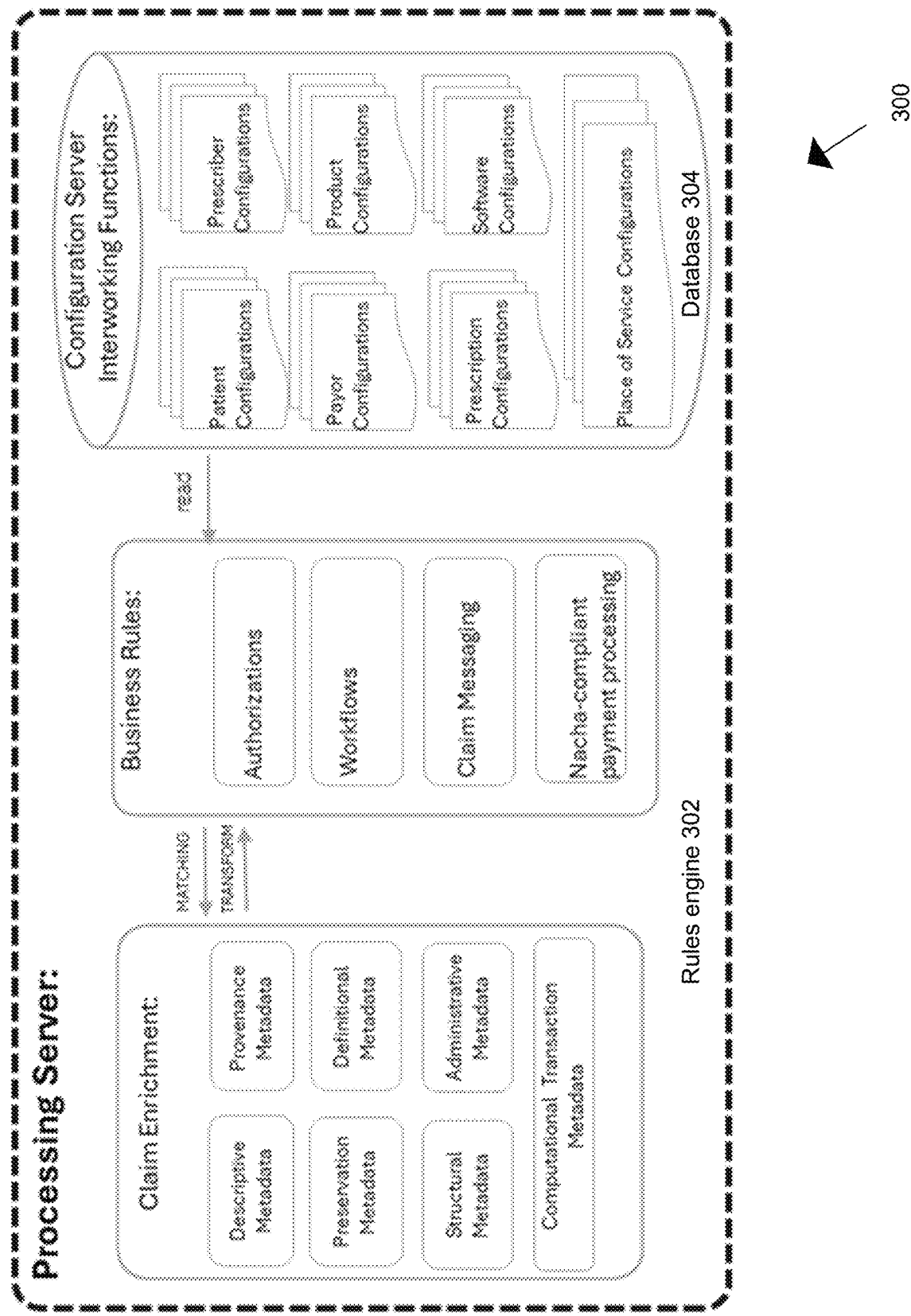
FIG. 3 shows a diagram of an embodiment of a rules engine and an embodiment of a database each configured for use in the system of FIG. 1 according to this disclosure.

FIG. 3 shows a diagram of an embodiment of a rules engine and an embodiment of a database each configured for use in the system of FIG. 1 according to this disclosure. In particular, there is a diagram 300 schematically illustrating a rules engine 302 and a database 304 each usable by the system 100 to perform the process 200. As shown in FIG. 3, there is a server hosting the rules engine 302 and the database 304. However, note that such configuration is not required and there may be one server hosting the rules engine 302 and another server hosting the database 304, where the rules engine 302 is enabled to interface with the database 304, as disclosed herein.

As explained above, the rules engine 302 may be embodied as the rules engine 112.2 and store various metadata (e.g., descriptive, preservation, structural, provenance, definitional, administrative, computational transaction) and various business rules (e.g., authorization rules, workflow rules, messaging rules, standard compliance rules), which enable the rules engine 302 to enrich messages received from the first or second routing application programs 108.2 or 110.2. For example, the rules engine 302 may receive a message (e.g., a communication) from a routing application program, as disclosed herein, and enrich the message with at least some metadata (e.g., descriptive, preservation, structural, provenance, definitional, administrative, computational transaction) to transform (e.g., augment, supplement) the message. Then, the rules engine 302 may apply at least some business rules to the message, as transformed, where such application may involve querying the database 304, as needed.

As explained above, the database 304 may have a schema (e.g., flat, hierarchical, network, relational, star, snowflake) according to which the database 304 stores its records. For example, in context of medical claim processing, the database 304 may have a set of tables (e.g., related to each other by a primary key) storing data (e.g., textual, structured, unstructured, descriptive) for configurations of patient profiles, a set of tables (e.g., related to each other by a primary key) storing data (e.g., textual, structured, unstructured, descriptive) for configurations of payor profiles, a set of tables (e.g., related to each other) storing data (e.g., textual, structured, unstructured, descriptive) for configurations of prescription profiles, a set of tables (e.g., related to each other by a primary key) storing data (e.g., textual, structured, unstructured, descriptive) for configurations of prescriber profiles, a set of tables (e.g., related to each other by a primary key) storing data (e.g., textual, structured, unstructured, descriptive) for configurations of product profiles, a set of tables (e.g., related to each other by a primary key)

storing data (e.g., textual, structured, unstructured, descriptive) for configurations of pharmacy software (e.g., input parameters, processing parameters, output parameters), and a set of tables (e.g., related to each other) storing data (e.g., textual, structured, unstructured, descriptive) for configurations of place of profiles. At least two of these sets of tables may be related to each other (e.g., via a primary key).

As explained above, the database 304 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Figure 4:
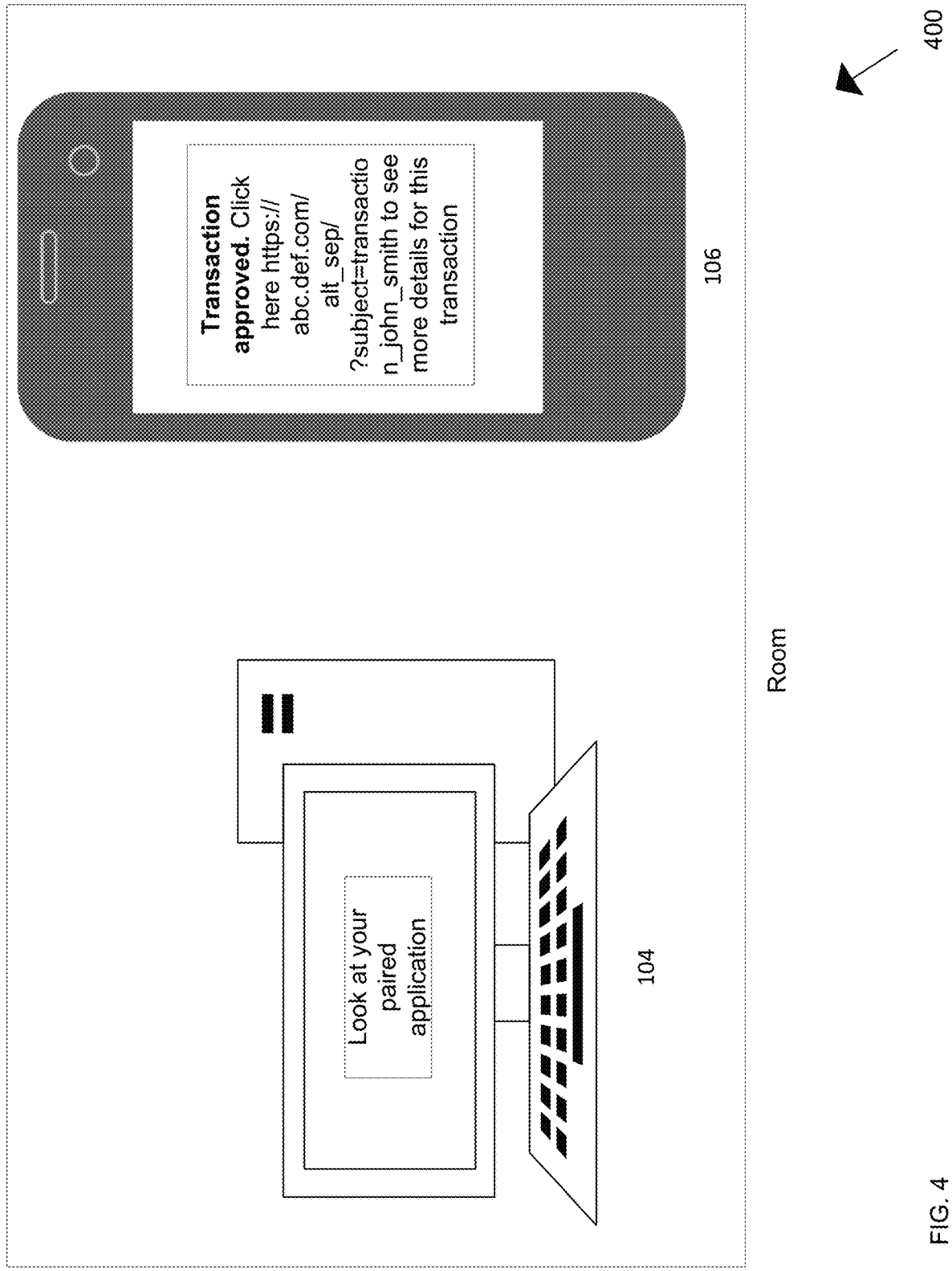
FIG. 4 shows a diagram of an embodiment of a pair of computing terminals hosting a pair of logically paired end user application programs enabling handoff continuity between computing terminals according to this disclosure.

FIG. 4 shows a diagram of an embodiment of a pair of computing terminals hosting a pair of logically paired end user application programs enabling handoff continuity between computing terminals according to this disclosure. In particular, pursuant to FIGS. 1 and 2, there is a pair 400 of computing terminals 104 an 106 hosting a pair of logically paired end user application programs 104.2 and 106.2 enabling handoff continuity between the computing terminals 104 and 106, as per the process 200. The first end user application program 104.2 hosted on the computing terminal 104 displays the handoff continuity notice inviting or signaling the user to access the set of information displayed on the second end user application program 106.2 hosted on the second computing terminal 106, as per the process 200. The computing terminal 104 and the computing terminal 106 may be co-positioned in a defined physical area (e.g., a cubicle, a room). For example, the computing terminal 104 and the computing terminal 106 may be physically collocated within the defined physical area. For example, the computing terminal 104 and the computing terminal 106 may be spaced apart from each other at about 1 meter or less, whether on a horizontal plane, a vertical plane, or a diagonal plane, which may allow the computing terminal 104 and the computing terminal 106 to simultaneously be within a physical reach of a hand of a user operating the computing terminal 104 and the computing terminal 106 (e.g., similar to an airplane cockpit). For example, the computing terminal 104 and the computing terminal 106 may be positioned side-by-side each other to simultaneously be within the physical reach of the hand of the user operating the computing terminal 104 and the computing terminal 106 (e.g., similar to an airplane cockpit). For example, the computing terminal 106 may be attached (e.g., via an articulating arm, a stand, a bracket) to the computing terminal 104. For example, the computing terminal 104 and the computing terminal 106 may be disposed on a common surface (e.g., a shelf, a tabletop, a stand). However, note that this configuration is not required and the computing terminal 104 and the computing terminal 106 may be disposed on different surfaces (e.g., one on a shelf and one on a tabletop).

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network, a neutrino network, an optical network (e.g., Li-Fi, fiberoptics), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled persons know that various modifications, additions, substitutions and the like can be made without departing from spirit of this disclosure. As such, these are considered to be within the scope of the disclosure, as defined in the following claims.

What is claimed is:

1. A system, comprising:
   a first computing terminal hosting a first end user application program associated with a first identifier and operated by a user;
   a second computing terminal hosting a second end user application program associated with a second identifier identical to the first identifier in value and operated by the user;
   a first server hosting a first routing application program;
   a second server hosting a second routing application program; and
   a third server hosting a rules engine containing a set of rules, wherein the first end user application program generates a request associated with a profile in context of a transaction involving the profile and sends the request to the first routing application program such that:
  (i) the first routing application program (a) receives the request, (b) generates a communication based on the request, and (c) sends the communication to the rules engine,
  (ii) the rules engine (a) receives the communication, (b) generates a first response based on the communication being applicable to the set of rules as the first identifier and the second identifier are identical to each other in value and a second response based on the communication being applicable to the set of rules as the first identifier and the second identifier are identical to each other in value where (1) the first response contains a handoff continuity notice to access the second end user application program and (2) the second response contains a set of information associated the profile and the request, and (c) sends the first response to the first routing application program and the second response to the second routing application program,
  (iii) the first routing application program (a) receives the first response from the rules engine, (b) generates a first reply based on the first response, and (c) sends the first reply to the first end user application program such that the handoff continuity notice is output by the first end user application program in context of the transaction based on the first identifier and the second identifier being identical to each other in value and the first end user application program being secured to avoid displaying, selecting, or clicking the set of information in context of the transaction, responsive to the first end user application program sending the request to the first routing application program, and
  (iv) the second routing application program (a) receives the second response from the rules engine, (b) generates a second reply based on the second response, and (c) sends the second reply to the second end user application program such that the second end user application program outputs the set of information associated with the profile and the request in context of the transaction according to the handoff continuity notice based on the first identifier and the second identifier being identical to each other in value, responsive to the first end user application program sending the request to the first routing application program.

2. The system of claim 1, wherein the first computing terminal and the second computing terminal are physically collocated within a defined physical area.

3. The system of claim 1, wherein the first server and the second server is one server, wherein the first routing application program and the second routing application program is one routing application program.

4. The system of claim 1, wherein the set of information is a Uniform Resource Locator (URL).

5. The system of claim 4, wherein the URL is a tokenized URL associated with the transaction.

6. The system of claim 1, wherein the first computing terminal and the second computing terminal are positioned within a pharmacy, wherein the profile is a patient profile.

7. The system of claim 1, wherein the request is formatted in a first format, wherein the communication is formatted in a second format.

8. The system of claim 1, wherein the first response or the second response is formatted in a first format, wherein the first reply or the second reply is formatted in a second format.

9. The system of claim 1, wherein the second computing terminal is at least one of a smartphone, a tablet computer, a laptop computer, a wearable computer, or a desktop, stationary or freestanding computer.

10. The system of claim 1, wherein the second routing application program sends the second reply to the second end user application program by pushing the second reply to the second end user application program.

11. The system of claim 1, wherein the second identifier is identical to the first identifier in value based on an input of the first identifier into the second end user application program before the first end user application program generates the request.

12. The system of claim 1, wherein the handoff continuity notice is a text notification to access the second end user application program.

13. The system of claim 1, wherein the handoff continuity notice is an image notification to access the second end user application program.

14. The system of claim 1, wherein the handoff continuity notice is a sound notification to access the second end user application program.

15. The system of claim 1, wherein the first end user application program outputs the handoff continuity notice as an outermost window.

16. The system of claim 1, wherein the first end user application program presents the handoff continuity notice in a visually distinct manner.

17. The system of claim 1, wherein the second end user application program presents the set of information after a user login into the second end user application program.

18. The system of claim 17, wherein the user login includes at least one of a biometric content or a two-factor authentication.

19. The system of claim 1, wherein at least one of the request, the first reply, or the second reply is formatted as a data file containing a set of segments where the set of segments contains a set of fields where each field in the set of fields contains a single data element associated with the profile where the set of fields and the set of segments are separated by a set of alphanumeric characters.

20. The system of claim 19, wherein the data file is compliant with a National Council for Prescription Drug Programs (NCPDP) format.

* * * * *